April 2, 1968     R. J. GOODWIN ET AL     3,375,887
METHOD OF DRILLING IN HARD FORMATIONS
Original Filed Sept. 24, 1963     5 Sheets-Sheet 3

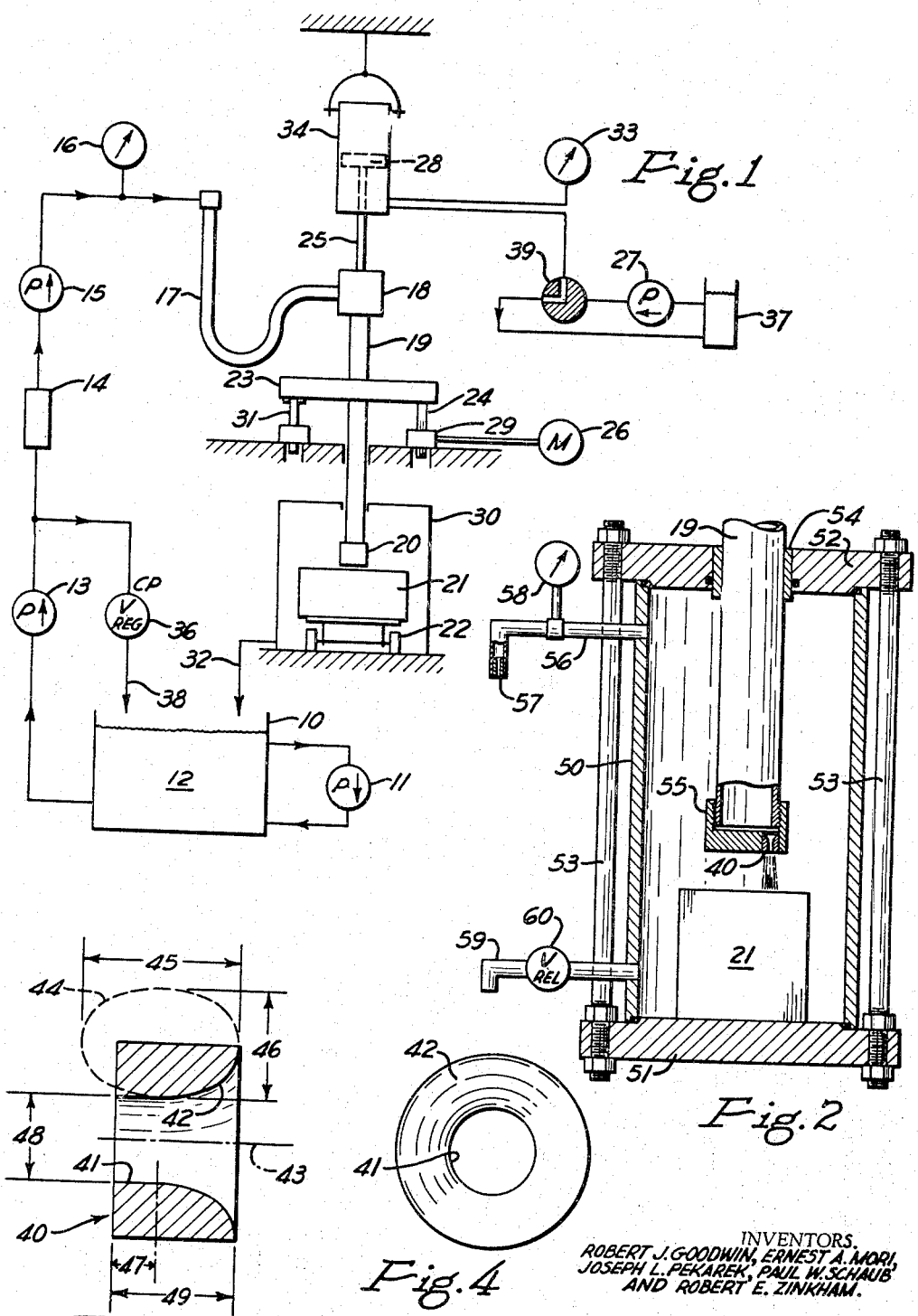

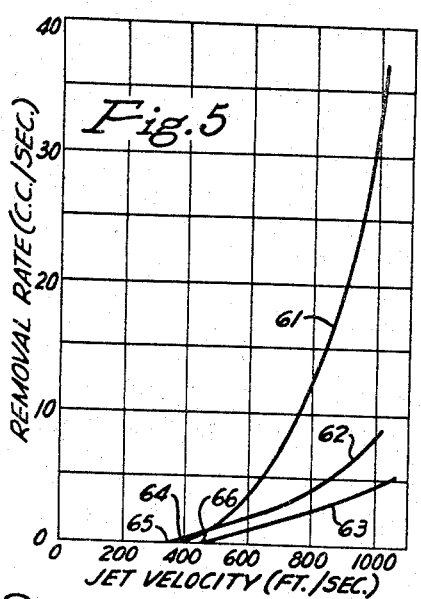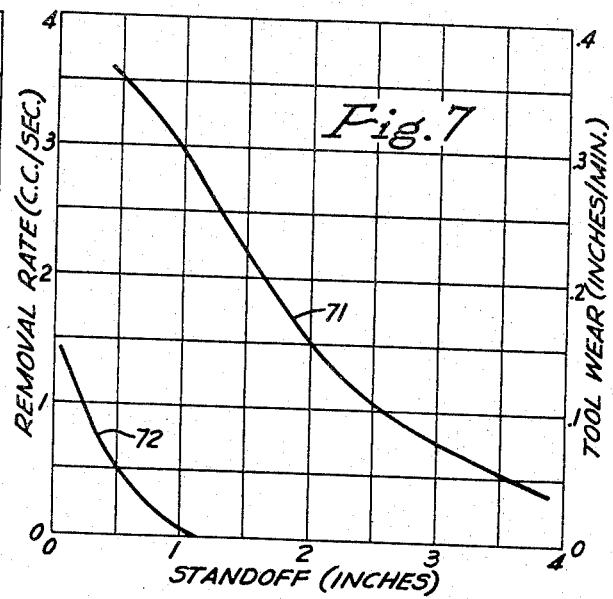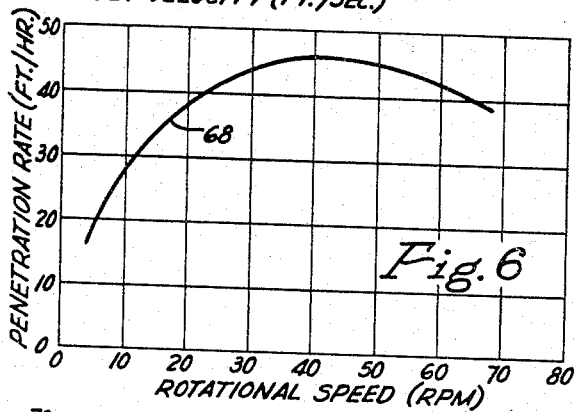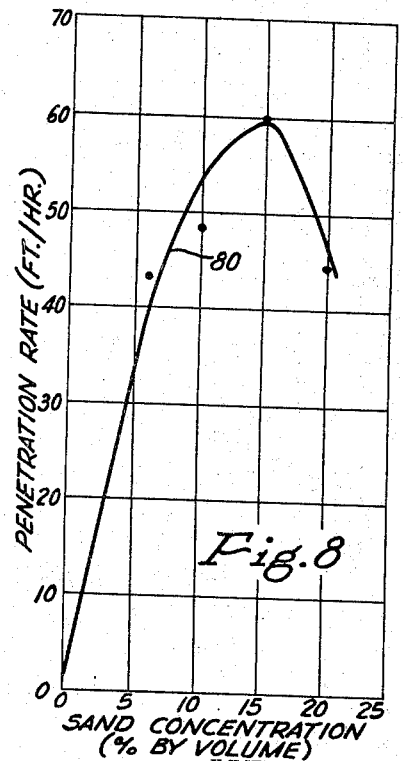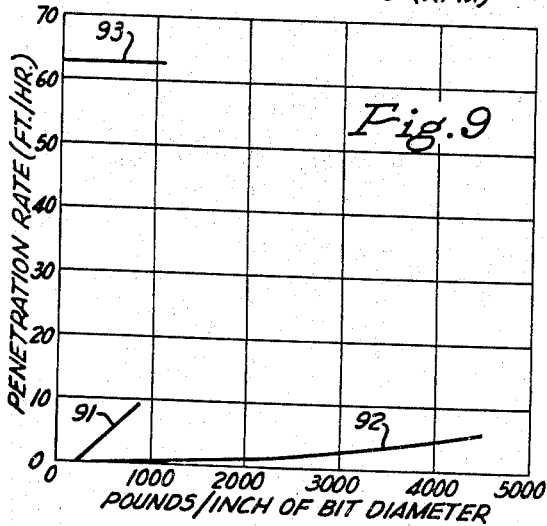

INVENTORS.
ROBERT J. GOODWIN, ERNEST A. MORI,
JOSEPH L. PEKAREK, PAUL W. SCHAUB
AND ROBERT E. ZINKHAM.

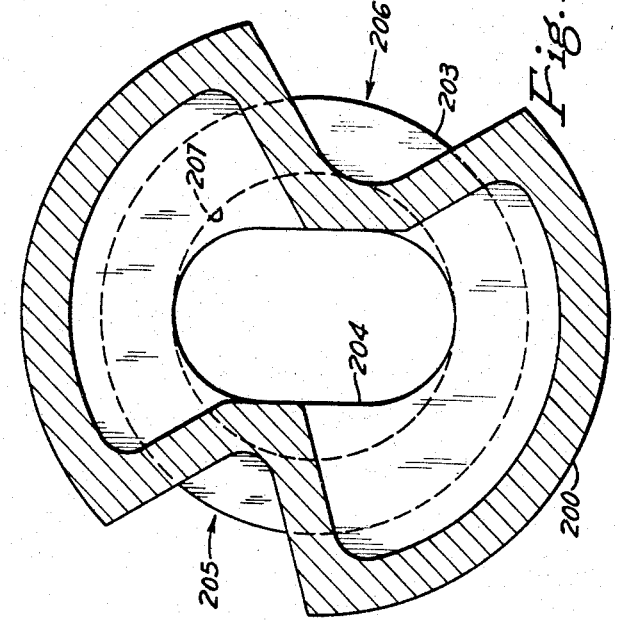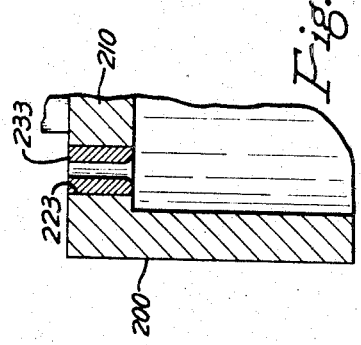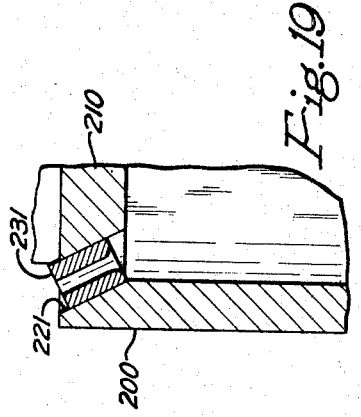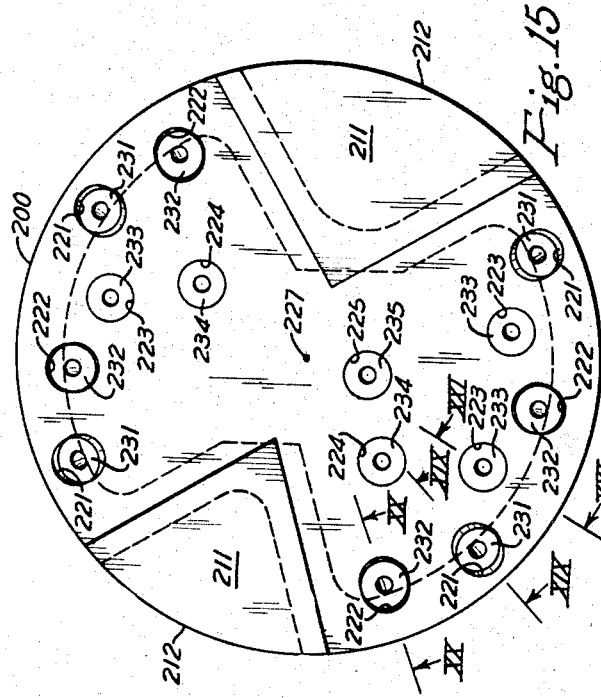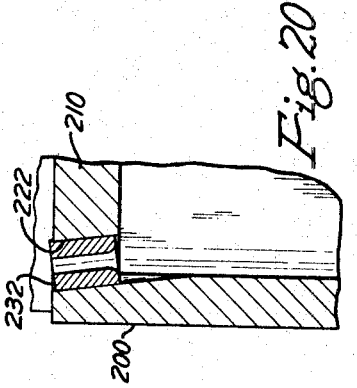
INVENTORS.
ROBERT J. GOODWIN, ERNEST A. MORI,
JOSEPH L. PEKAREK, PAUL W. SCHAUB
AND ROBERT E. ZINKHAM.

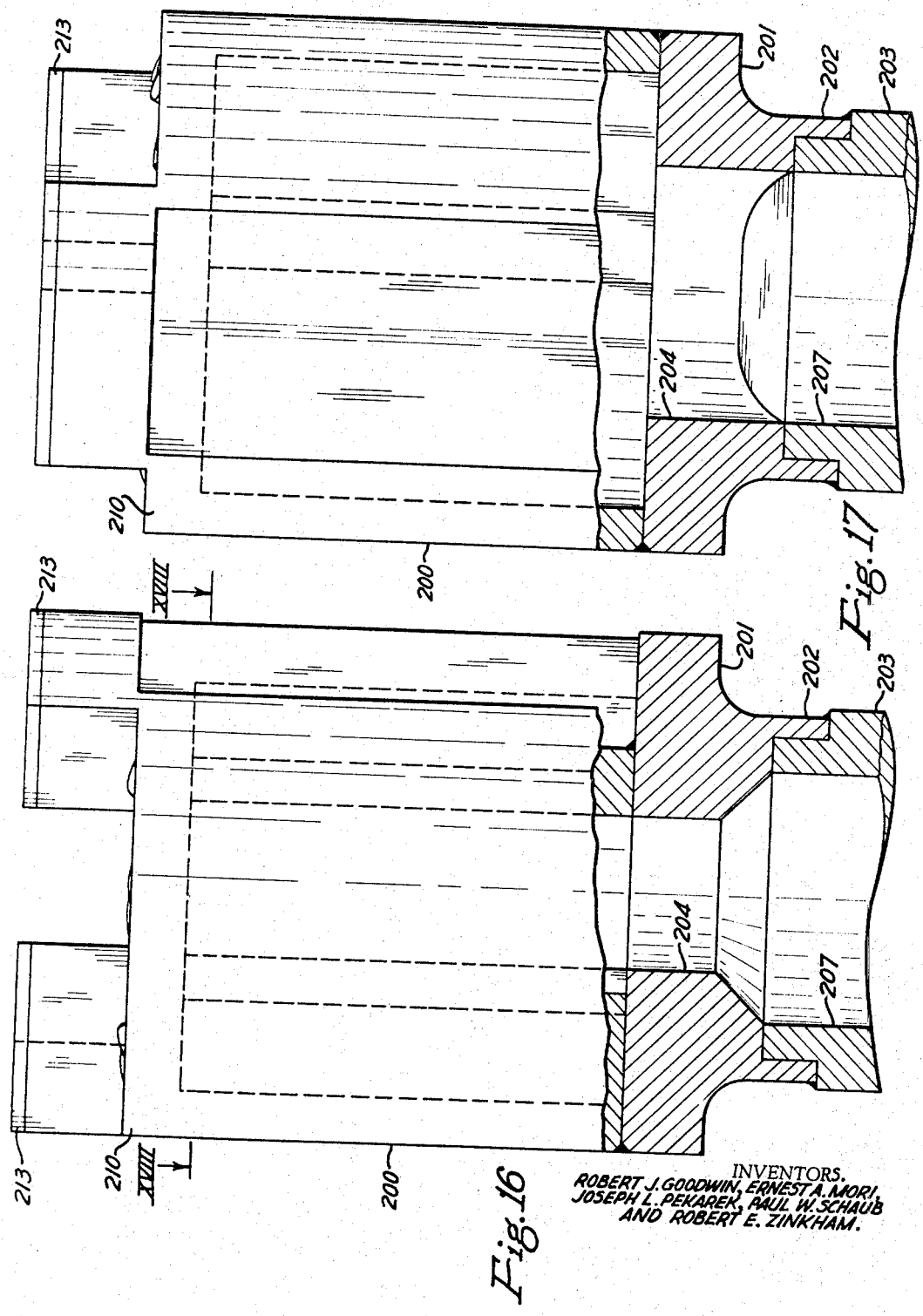

United States Patent Office 3,375,887
Patented Apr. 2, 1968

3,375,887
METHOD OF DRILLING IN HARD FORMATIONS
Robert J. Goodwin, Oakmont, Ernest A. Mori, Hampton Township, Allegheny County, and Joseph L. Pekarek and Paul W. Schaub, Penn Hills Township, Allegheny County, Pa., and Robert E. Zinkham, Richmond, Va., assignors to Gulf Research & Development Company, Pittsburgh, Pa., a corporation of Delaware
Continuation of application Ser. No. 311,088, Sept. 24, 1963. This application Aug. 11, 1967, Ser. No. 660,065
5 Claims. (Cl. 175—67)

ABSTRACT OF THE DISCLOSURE

A hydraulic jet method of drilling in which a plurality of jet streams of abrasive-laden liquid are discharged downwardly at extremely high velocities from nozzles in a drill bit rotating at the bottom of the borehole about a vertical axis. The nozzles are positioned in the bit to provide a high rate of drilling, a low rate of erosion of the bit by rebounding abrasive particles, and substantially uniform penetration of the formation drilled over the area of impingement of the abrasive particles.

---

This application is a continuation of our copending application, Ser. No. 311,088, filed Sept. 24, 1963 and entitled, Hydraulic Jet Method of Drilling.

This invention relates to the art of drilling deep boreholes in the earth and in particular concerns a drilling process and drill bit employing hydraulic jets to perform substantially all of the rock-cutting action.

Conventional devices for drilling deep boreholes function by making physical contact of the cutting surfaces of a metal drill bit with the rock formation at the bottom of the hole to mechanically cut the rock away. Such drill bits as the well known fish-tail bit, drag bit, core bit, roller bit, cone bit, disk bit, etc., all operate to make hole by mechanically breaking up the rock at the bottom of the hole whence the cuttings are removed to the surface of the earth by means of a circulating fluid medium such as air, foam, or drilling mud. In mechanically breaking up the rock it is inevitable that a substantial amount of wear and breakage also occurs to the cutting elements of such a drill bit, so that eventually the bit wears out and can no longer make hole. The drill stem must then be withdrawn from the hole, the bit replaced, and the bit stem with the new bit reinserted in the borehole. In drilling hard formations in a deep hole the time spent replacing conventional drill bits may exceed the actual drilling time on bottom, and this results in a loss of efficiency and very substantially increases the expense of the drilling operation.

Hydraulic jets have heretofore been included with conventional drill bits, but these jets have been for the purpose of keeping the cutting edges of the drill bit, or the rock surface being cut, free from mud and chips produced by the bit thereby to increase the efficiency of the mechanical cutters on the bit. However, such ancillary jets as have been employed with conventional rock bits have no effective cutting action when operated under the pressures normally employed for fluid circulation in conventional mechanical drilling operations.

We have found that when hydraulic jets are operated at very high pressure so that extremely high velocities are attained by the emerging jet stream, the fluid jet is very effective in making hole even in hard rock. By omitting substantially all mechanical cutters from the drill bit there is obtained a bit that is substantially free of mechanical wear or breakdown. Accordingly when such a bit is used in the hole, it will remain effective to make hole for a much longer period of time than a bit that includes mechanical cutting elements. Also due to the fact that the jets tear up the rock into very small fragments, the cuttings are more easily removed by the circulating fluid than are the larger cuttings made by conventional mechanical drill bits. Furthermore because of the mechanical simplicity of such an all-jet bit, such bits are very sturdy and are also relatively inexpensive thus resulting in a further saving of drilling expense. In addition, when such bits are operated in accordance with the process of this invention they are found to make hole at a much faster rate than conventional mechanical bits.

A further disadvantage of conventional mechanical bits which is overcome by this invention is that a mechanical bit requires substantial weight to be applied to the bit in order to make it cut the rock being drilled. It is well known that high bit weight results in faster drilling with a mechanical drill bit, but it is also known that high bit weight causes greater wear on bit teeth and cone bearings, and also results in greater deviation from a straight hole. By the use of the present invention the weight on the bit is reduced very substantially over that used in mechanical drilling with resulting imrpovement in hole straightness.

When using conventional mechanical drill bits, the drill stem is required to perform three functions, namely (1) serve as a conduit for the drilling fluid, (2) serve to apply weight to the drill bit, and (3) serve to apply torque to rotate the drill bit. The latter two of these functions are stringent requirements that dictate the use of heavy pipe made of expensive high-strength steel. By the use of the present invention the requirements of applying weight and torque to the drill bit are substantially eliminated, whereby it becomes possible to use lighter weight, inexpensive drill pipe. In the present invention the only function of the drill pipe placing a severe stress on the drill pipe is serving as a conduit for the high-pressure drilling fluid which in the substantial absence of other mechanical stresses is easily met.

Accordingly, it is an object of this invention to provide an earthbore drilling process, apparatus, drill bit, and drilling fluid that are highly effective in cutting hard rock without the use of mechanical cutters.

It is another object of this invention to provide a drilling process and drill bit capable of rapidly making hole and which employs high-velocity hydraulic jets to penetrate the rock to be drilled.

A further object of this invention is to provide an all-jet drill bit that is highly efficient in making hole.

A further object of this invention is to provide an earthbore drilling process that permits drilling with greatly reduced weight or torque on the drill stem, thereby permitting the use of light-weight drill pipe.

A still further object of this invention is to provide a hydraulic jet drill bit having a high hole-making efficiency.

These and other useful objects are attained by the invention described in this specification with reference to the accompanying drawings forming a part thereof, and in which:

FIGURE 1 is a diagrammatic illustration of a test set-up that is employed in testing jet bits;

FIGURE 2 is a cross section of a pressure chamber employed in testing nozzles under back pressure;

FIGURE 3 is a cross section of an individual nozzle employed in this invention;

FIGURE 4 is an end view of the nozzle employed in this invention;

FIGURE 5 is a graph showing the relation between rock removal rate and velocity of the jet stream;

FIGURE 6 is a graph showing the relation between penetration rate of a jet drill of this invention and the rate of rotation of the drill;

FIGURE 7 is a composite graph showing the relation between rock removal rate and nozzle standoff, and also the relation between tool wear and nozzle standoff;

FIGURE 8 is a graph showing the relation between rock penetration rate per hydraulic horsepower and sand concentration in the drilling fluid;

FIGURE 9 is a graph showing the relation between rock penetration rate and weight on the drill bit for two types of conventional mechanical bits and for the bits of this invention;

FIGURE 15 is a bottom view of a second embodiment of a drill bit made in accordance with this invention;

FIGURE 16 is a front elevation partly in section of the drill bit of FIGURE 15 as viewed from the lower side of FIGURE 15;

FIGURE 17 is a side elevation partly in section of the drill bit of FIGURE 15 as viewed from the right side of FIGURE 15;

FIGURE 18 is a section through FIGURE 16 at the plane XVIII—XVIII;

FIGURE 19 is a partial section through a nozzle of FIGURE 15 at the plane XIX—XIX;

FIGURE 20 is a partial section through a nozzle of FIGURE 15 at the plane XX—XX; and FIGURE 21 is a partial section through a nozzle of FIGURE 15 at the plane XXI—XXI.

Figure 10:
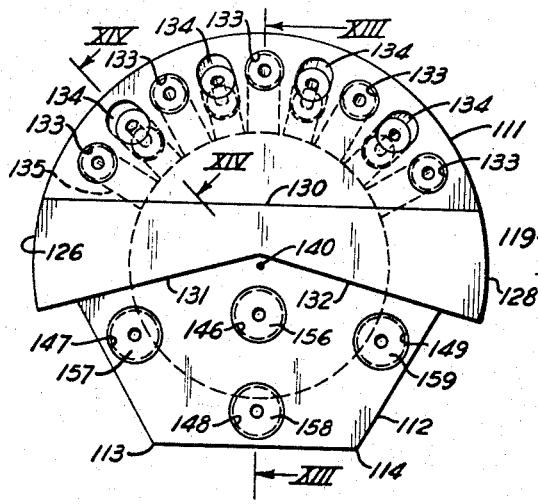
FIGURE 10 is a bottom view of a drill bit made in accordance with this invention.

We have now found that when a plurality of hydraulic jet streams of extremely high velocity are rotated in a borehole, very effective cutting action is obtained even in hard rock. In accordance with this invention, the velocity of said streams exceeds the critical minimum cutting velocity for the earth material being penetrated. The high-velocity jet streams are so disposed as to effect a substantially uniform distribution of downward penetration over the area of impingement of the jets. It is to be noted that in contrast to prior-art drilling devices, there is substantially no downward penetration into the formation drilled by physical contact of the tool employed to produce said hydraulic jets with the surfaces of the formation being drilled. Thus, the tool or "bit" of the present invention is substantially free of the wear or breakdown occasioned by the physical contact of prior-art bit surfaces with the rock formation being drilled.

Although we have for convenience herein used the term "bit" to describe the drilling tool of the present invention, from the foregoing and the detailed description which follows it will be apparent to those skilled in the art that the process and apparatus of the present invention are entirely different from prior-art drill bits. A distinction is made between prior-art drill bits which are of the mechanical type wherein the downward penetration into the formation drilled is by physical contact of the metal cutting elements of the bit with the rock formation at the bottom of the hole, and the jet bits of this invention wherein the downward penetration of the formation drilled results from the erosive action of a high-velocity jet stream issuing from a nozzle that does not contact the rock formation, and as will become evident, functions most advantageously when the nozzle is spaced a specified distance (called the "standoff") from the rock being drilled or bored.

A further distinction between drilling with a conventional mechanical drill bit and the jet drilling process of this invention lies in the manner in which the drilling energy is transmitted and delivered to the formation being drilled. In mechanical drilling substantially all of the energy used to cut and break up the rock is transmitted by torque through the drill stem to be delivered against the rock by physical contact of the mechanical cutting elements of the bit. In jet drilling as taught by this invention the energy to penetrate the rock is transmitted hydraulically through the drilling fluid to be delivered directly against the rock by the high-velocity jet streams. Because of the higher efficiency of hydraulic transmission as compared with mechanical transmission the jet drilling process of this invention delivers to the rock a higher percentage of the total input power. Furthermore, as will be explained, physical contact of the jet bits of this invention with the bottom of the hole is used to maintain optimum standoff of the nozzles during rotation of the bit, so that very low bit weight is employed. The absence of mechanical cutters together with low bit weight results in very low drill-stem torque when using the jet-drilling process and jet bits of this invention, and this further improves the overall power efficiency of the drilling operation.

We have found that certain principles govern a jet drilling process and for most efficient operation of a jet drill these principles must be taken into account in designing and constructing a jet drill bit and in its operation. We have found that unless a critical minimum cutting velocity is exceeded by the jet stream it does not appreciably cut the target material. The critical minimum cutting velocity varies both with the target material and the nature of the jetting fluid. The general shape of the curves relating target removal rate and jet velocity for different jets and targets are shown in FIGURE 5. Curve 61 pertains to a jet stream of plain water on an Indiana limestone target. Curve 62 pertains to a sand-laden jet stream on a granite target. Curve 63 pertains to a sand-laden jet stream on a dense limestone. These curves represent tests made with the apparatus of FIGURES 1, 2, 3, and 4 to be described later. These curves were obtained with the nozzle test apparatus to be described later and the curves pertain to a nozzle having an exit opening of 3/16-inch diameter operating at 1-inch standoff from the target in an ambient fluid under 325 p.s.i.g. back pressure, the nozzle being rotated on a radius of 1 1/8 inches at 38 r.p.m. during the test. It is seen from the curves of FIGURE 5 that there is a critical minimum cutting velocity indicated by the intercepts 64, 65, and 66 in the range of 300 to 450 f.p.s. The critical minimum cutting velocity is known to be different for different types of rock and for different types of jet fluids. It is apparent that unless the jetting fluid is supplied to the nozzle under a pressure sufficiently high to impart to the emerging jet stream a velocity at least as high as the critical minimum cutting velocity the jet will have substantially little effect on the target.

Accordingly, in the practice of this invention the pressure of the cutting fluid must be high enough to cause the hydraulic jets to exceed the critical minimum cutting velocity. In the ensuing dislosure and claims it is to be understood that the velocity of the hydraulic jet streams is in excess of the critical minimum cutting velocity for the particular rock being drilled and for the particular jet fluid composition under consideration. The difference in pressure across a nozzle required to effect a jet stream exit velocity that corresponds to the critical minimum cutting velocity is herein termed the critical minimum cutting pressure. Its value for any particular fluid and target material may easily be determined by experiment, for example as herein described, since only at fluid pressures that exceed the critical value does any substantial rock removal or drill penetration occur as illustrated in FIGURE 5. A few typical values of the critical minimum cutting velocities and corresponding critical minimum cutting pressures are as follows:

| Rock Type | Jet Fluid | Critical Minimum Cutting Velocity and Pressure at 1-inch Standoff [1] | |
|---|---|---|---|
| | | Velocity, f.p.s. | Pressure, p.s.i.g. |
| Indiana limestone | Water | 400 | 1,200 |
| Do | Aqueous mud with 6% sand [2] and 6% bentonite.[3] | 300 | 800 |
| Gray granite | do | 400 | 1,400 |
| Dense limestone | do | 450 | 1,700 |

[1] Standoff is defined as the distance between the exit end of the nozzle and the target.
[2] Sand measured by bulk volume.
[3] Bentonite by weight.

In order to approximate field conditions as closely as possible a test setup was designed so that the test results are directly applicable to field drilling. Tests were made on a variety of individual nozzles for which various parameters were varied to determine the effect of the parameter on the cutting or drilling rate of the resulting high-velocity jet stream under similar conditions of jet velocity and other fixed conditions. Tests were also made on entire jet bits in order to determine the hole-making efficacy of the jet bits herein described which employ the nozzles disclosed as being most effective in making hole. In the following description values of bit weight, speed of rotation, sand concentration in the jet stream, nozzle standoff from the target, superposition of jets, and specific jet bit structures embodying these parameters to provide high drilling rates in hard formations are set forth.

Two similar but slightly different experimental arrangements were employed for testing whole jet bits and for testing individual nozzles. The experimental testing arrangement employed for testing a whole jet bit is schematically illustrated in FIGURE 1. A block 21 of rock (target) to be drilled was mounted on a carriage 22 which may by means of tracks be run into a chamber 30. The block 21 was large enough so that a number of holes could be drilled into it in order that comparative tests of drills could be made on the same block of rock. The chamber 30 has a removable front closure (not shown) through which the carriage 22 may be run into the chamber. The drill stem 19 is rotated by means of a rotary table 23 driven through a vertical splined shaft 24 by a motor 26 located on the balcony of a laboratory building in which the apparatus is housed. The drill stem 19 is clamped to the rotary table 23. The rotary table is free to move vertically in the gearing 29 that drives splined shaft 24 and is guided by guide legs 31, four in number, but only one of which is shown. The upper end of the drill stem 19 is provided with a conventional swivel 18 connected by means of a flexible connection 17 with a source of drilling fluid under pressure to be described. The swivel 18 is supported by the piston rod 25 of a hydraulic cylinder 34. By means of hydraulic fluid from pump 27 supplied beneath the piston 28 of the cylinder 34, and entire assembly comprising swivel 18, drill stem 19, and rotary table 23 may be raised when three-way valve 39 is turned into the appropriate position, i.e., to the right. Similarly by turning valve 39 to the left the system can be lowered by bleeding hydraulic fluid into the supply tank 37. The cylinder 34 is supported by means of a conventional hoisting line. The drill stem 19 passes through the top of the chamber 30 and has screwed to its lower end the jet drill bit 20 under test.

A tank 10 is provided in which the drilling fluid 12 is mixed. In the tests the drilling fluid was usually an aqueous suspension of sand and included bentonite as the suspending agent. In order to prevent settling and to maintain the drilling fluid 12 as uniformly mixed as possible, a pump 11 is provided for the purpose of rapidly circulating the drilling fluid in tank 10 thereby keeping the drilling fluid 12 well mixed. The drilling fluid from the tank 10 is pumped by means of pump 13 into a high-pressure pump 15. A flowmeter 14 is provided intermediate the pumps 13 and 15. High pressure pump 15 delivers the drilling fluid under high pressure directly to the flexible connection 17 and thence via drill stem 19 to the jet bit 20. After the drilling fluid traverses the drill bit 20, the spent fluid returns to the tank 10 by gravity flow through line 32. A pressure gauge 16 is provided to monitor the pressure of the drilling fluid delivered by pump 15. In order to insure that pump 15 will always be provided with an adequate amount of input fluid, the pump 13 is somewhat larger in volumetric capacity than pump 15. A constant pressure input regulating valve 36 which maintains constant pressure on the input side of pump 15 is connected as indicated in FIGURE 1. Fluid from pump 13 bypassed by the valve 36 is returned to the tank 10 via line 38. Readings of the flowmeter 14 and pressure gauge 16 are recorded on conventional chart recorders (not shown) connected to these instruments. The weight on the bit is determined from the indication of pressure gauge 33 as will be explained.

Drilling tests on whole jet bits were performed with the above-described apparatus with atmospheric air pressure inside the chamber 30. In performing such tests the drilling assembly is first raised by turning valve 39 to the right to apply hydraulic fluid to cylinder 34 and raise the piston 28. The pressure indicated by gauge 33 under the piston 28 of cylinder 34 with valve 39 closed and with the entire drill system hanging free reflects the static weight of the system. When ready to drill, the valve 39 is turned to the left and hydraulic fluid is slowly bled from cylinder 34, thus lowering the entire drill assembly. When drilling, the pressure as indicated by gauge 33 is reduced and this reflects the load in drill stem 19. As drilling progresses, the valve 39 is manually continually adjusted to maintain a predetermined reading on gauge 33. The weight on the bit is less than this load by the vertical reaction force of the fluid emerging from the jet bit 20. The vertical reaction force is easily computed by well known methods from the pressure (as read on gauge 16), rate of flow (as indicated by meter 14), and the measured density of the drilling fluid. In addition after the bit has made hole, the bit weight is still further reduced somewhat by the friction of drilling fluid flowing upward around the outside of bit 20, but this component is not easily computed and is not taken into account. In all of the tests the valve 39 was manually adjusted during drilling so that the bleedoff of hydraulic fluid from cylinder 34 is such as to hold a reading on gauge 33 that would result in a net bit weight of about 2,200 pounds, which for the 4⅝ inch diameter bits employed is equivalent to a bit weight of about 500 pounds per inch of bit diameter (this being the conventional manner of expressing bit weight). As the bit made hole and progressed into the target 21, the entire drill assembly was gradually lowered by bleeding hydraulic fluid through valve 39, always maintaining the predetermined pressure as indicated by gauge 33 so as to maintain in the above-mentioned bit weight.

While tests with hole jet bits were made with atmospheric air pressure in chamber 30, it appeared that immediately upon the drill penetrating the target a short distance all of the jets of the bit operated in ambient discharged drilling fluid. Furthermore, the resistance to flow of drilling fluid upward around the body of the bit developed a back pressure that is believed to simulate well conditions reasonably closely. Penetration of the whole bit into the target during a test time interval was measured by marking the shaft of one of the guides 31 attached to the rotary table 23.

The apparatus is also arranged so that drilling may alternatively be performed under conditions of ambient fluid under measurable back pressure. All tests herein described made on single individual nozzles were made under back pressure since at the bottom of a drilling well there is always ambient drilling fluid present. The apparatus of FIGURE 1 was employed except that the chamber 30 was modified as shown in FIGURE 2. For back pressure tests the chamber comprised a cylinder 50 approximately 20 inches in diameter closed at the bottom and top by caps 51 and 52 respectively, the caps being held in place by means of tie bolts 53. The upper cap 52 was provided with a rotating sealing assembly 54 through which the drill stem 19 enters the chamber without appreciable leakage. The target rock 21 to be drilled was placed inside the cylinder 50 and held in place by clamps (not shown). The end of the drill stem 19 was provided with a nozzle holder 55 in which the nozzle 40 to be tested was mounted as by brazing. The axis of the nozzle 40 is eccentric with respect to the axis of the rotating drill stem 19. The nozzle 40 has its axis parallel to the axis of the drill stem with a radius of rotation of 1⅛ inches.

Drilling fluid from drill stem 19, after passing through the nozzle 40 and filling cylinder 50, was discharged from the cylinder through a discharge pipe 56. In order to develop back pressure in the cylinder 50 the end of the pipe 56 was provided with a nozzle 57. The drilling fluid emerging from nozzle 57 thus created a pressure inside the cylinder 50 which was measured by means of pressure gauge 58. Discharge from nozzle 57 is returned to tank 10. It was found by experiment that the existence of back pressure affects the target removal rate of a jet under certain circumstances, but for back pressure exceeding about 250 p.s.i.g., increasing the back pressure and substantially no further effect on the drilling rate under the same differential pressure across the nozzle 40 under test. Accordingly, the nozzle 57 was designed to provide a back pressure that in all cases exceeded 250 p.s.i.g. as read on gauge 58. In performing tests on individual nozzles in the back-pressure chamber of FIGURE 2, the differential pressure across the nozzle 40 was taken as the indication of gauge 16 (FIGURE 1) minus the indication of gauge 58 (FIGURE 2). For safety the cylinder 50 was provided with an auxiliary discharge line 59 containing a conventional safety valve 60.

The type of nozzle 40 employed is shown in cross section in FIGURE 3 and in end view in FIGURE 4. The nozzle has a circular opening 41 having a central axis 43 and a diameter 48. With such nozzles it is customary to employ an entrance contour 42 of elliptical shape followed by a straight parallel-sided portion 41 of length 47. The generating ellipse for the entrance portion 42 is indicated by the dashed line 44 of FIGURE 3 and the ellipse has a major axis dimension 45 and a minor axis dimension 46. The nozzle is made of a hard, wear-resistant material, as for example the cemented tungsten carbide materials commercially available under the registered trademark Kennametal. The nozzles of FIGURES 3 and 4 were made in a variety of total lengths 49 and diameters 48 but otherwise with an elliptical entrance portion 42 having the same type generating ellipse 44. Tests were made with nozzles of the type shown in FIGURES 3 and 4 mounted in the apparatus of FIGURES 1 and 2 and certain parameters changed from test to test and the drilling effect on the rock sample 21 observed. In the individual nozzle tests only one nozzle was tested at a time.

Tests on individual nozzles were conducted in the following manner. The nozzle 40 to be tested was mounted in the back-pressure apparatus of FIGURES 1 and 2 and the target rock 21 placed in the cylinder 50. The drill stem 19 was lowered to bring the nozzle 40 into a desired standoff distance from the upper surface of the target rock 21 and held at this point during the test by clamping the guides 31. Pump 11 was started in order to thoroughly mix the drilling fluid 12. Pump 13 was started and the rotary table 23 brought up to prescribed speed. Pump 15 was then started and the drilling time measurement was begun when the pressure gauge 16 indicated the desired pressure. This meant that after starting pump 15, the jet from nozzle 40 played on the rock surface a few seconds before time until the desired pressure was reached at which point the timing was begun, but this caused only negligible error. The desired testing time, usually 30 seconds, was measured with a stop watch, the test being stopped by quickly shutting down pump 15. The test resulted in cutting a circular groove in the top of the target rock 21. The same block was used for testing the effect of a single variable, or if it became necessary to use different blocks their similarity was checked by first making test runs under identical operating conditions. Two tests were made for each determination and the results averaged to establish a point on a curve.

In making tests on whole bits the apparatus of FIGURE 1 was used with the chamber 30. By hydraulically adjusting the position of piston 28 the drill system was brought to a height such that the bottom of the drill bit was about one inch above the top of the target rock 21. The door of the chamber 30 was then closed and the pumps and rotary table started. The drill was held at this elevation for 20 seconds, which resulted in the formation of some annular grooves being cut into the top of the rock 21. The valve 39 was then turned to bleed hydraulic fluid from cylinder 34 so as to lower the drill system under the predetermined reading of gauge 33. The drill system was thus lowered two inches from its initial position, this meaning that the drill bit 20 had then penetrated the rock 21 a distance of one inch. At this point timing was started and by means of a stop watch the time required to drill 12 inches (or 14 inches if the block of rock permitted) was measured. During the timed drill test, the valve 39 was continually manually controlled to maintain the predetermined reading of gauge 33 so as to hold the desired weight on the bit. Depth of penetration of the drill was determined from a scale on one of the rotary table guides 31. The test was stopped by quickly shutting off the pumps 13 and 15, rotary table motor 26, and closing valve 39.

During a test run, the readings of pressure gauges 33 and 58 were manually recorded and the flow rate as measured by flowmeter 14 and the reading of pressure gauge 16 were automatically recorded. Density of the drilling fluid was periodically measured with a standard drilling mud balance, and viscosity was periodically measured with a standard Marsh funnel by measuring the number of seconds required to pass 32 ounces of the drilling fluid from a 2,000 cc. container. The sand concentration was determined by catching a given volume of drilling fluid with a standard sand-control container from the bypass return line 38 (FIGURE 1) and using the A.P.I. procedure by measure and content. Sand particle size was determined by standard sieving technique. In the individual nozzle tests the distance from the rock surface to the nozzle exit, termed the "standoff," was initially set by holding the drill stem at a fixed vertical position and a slight gradual increase in effective standoff occurred during the test as hole was cut. In the whole bit tests, the bit itself had provision to maintain the desired optimum standoff continually during drilling, the drill stem being gradually lowered during the test. The nozzle diameter was determined with an ID gauge as the internal diameter 48 (FIGURE 3) of the nozzle exit opening. From the flow rate measured by flowmeter 14 (and checked by observing the r.p.m. of pump 15) and the measured nozzle diameter, the velocity of the jet stream emerging from the nozzle was calculated. Also from the measured flow rate and the pressure differential across the nozzle (reading of gauge 16 minus the reading of gauge 58) the hydraulic horsepower expended at the nozzle was calculated. The tests were timed with a stop watch.

The results of individual nozzle tests were determined in the following manner. The volume of rock removed was determined by pouring water from a graduate into the circular groove cut into the already water-saturated rock by the jet stream during the test. The depth of penetration was determined by taking the average of four measurements with a depth gauge separated 90° in azimuth in the groove cut by the jet stream. The inside and the outside diameters of the groove cut by the jet stream were also measured.

In all of the tests the pressure of the drilling fluid in the drill stem as measured by pressure gauge 16 was maintained above that required to effect an exit velocity from the nozzle that exceeded 650 f.p.s. The jet velocity in all of the tests thus exceeded the critical minimum cutting velocity. In the interest of uniformity, a pressure of 5000 p.s.i.g. or higher was employed in all of the tests in order to provide a resulting nozzle exit velocity of 760 f.p.s.

We have found that the standoff of a jet nozzle is an important parameter in determining the rock removal rate. The standoff is defined as the distance from the exit end of the nozzle orifice to the target. Two mutually conflicting considerations are effective in determining optimum standoff. In the case of a jet operating in an ambient liquid such as exists at the bottom of a fluid-filled drill hole, the jet tends to spread and to lose velocity after it leaves the nozzle, and this points to the use of as small a standoff as possible. On the other hand, if the nozzle is placed very close to the target, it is found that the jet encounters its own backsplash and this is detrimental for two reasons, namely, the high-velocity backsplash will reduce the jet velocity just prior to the moment the jet stream strikes the target so that a lower actual impact velocity exists, and the backsplash also very quickly erodes the nozzle or its mounting so that the operating life of the tool is reduced. FIGURE 7 shows the relationship of these two effects. Curve 71 shows how the rock removal rate decreases with increasing standoff (under back pressure) and curve 72 shows how wear on a steel tool decreases with increasing standoff. Tool wear as shown in curve 72 was determined on a whole bit by measuring for various standoff distances the reduction in length of the body of the drill bit with drilling time (change in dimension 75 of FIGURE 11 to be described later) in the apparatus of FIGURE 1. Aqueous drilling fluid containing 6% by bulk volume of sand of predominantly 20 to 40 mesh and 6% by weight of bentonite was used. The curve 71 was obtained using the apparatus of FIGURES 1 and 2 with a single nozzle of FIGURES 3 and 4 whose opening was ⅛ inch diameter, operating at 5000 p.s.i.g. across the nozzle with various standoffs and using aqueous drilling fluid containing 6% by weight of bentonite and 6% by volume of sand of predominantly 20 to 40 mesh. These relationships show that a standoff in the range of ½ inch to 1¼ inches is optimum and we prefer to use a standoff in the range ½ inch to 1 inch. Accordingly in the jet drill bits of FIGURES 10 to 21 to be described provision is made to maintain 1 inch standoff.

A further increase in the hole making properties of the drill herein described results from the use of a fluid medium that contains abrasive particles. We have found that above the critical minimum cutting velocity, the penetration rate of the jet varies with the sand concentration in the drilling fluid as shown by curve 80 in FIGURE 8 when the same nozzle, hydraulic horsepower, and jet velocity are employed. Curve 80 was taken using the apparatus of FIGURES 1 and 2 with a jet bit similar to that shown in FIGURES 10 to 13 and having eleven ⅛ inch diameter nozzles operating at 5000 p.s.i. across the bit with 1 inch standoff. The rock drilled was gray granite. Aqueous drilling fluid containing various percentages of sand was employed. As a suspending agent, we prefer to use bentonite in concentration between about 2% and about 10% by weight, and 6% by weight was used in the tests. In making the tests the fluid pressure was adjusted to compensate for various fluid densities so that the jet exit velocity was constant at 770 f.p.s. The sand employed had a particle size predominantly between 20 and 40 mesh. The sand concentration was determined by catching a sample of drilling fluid from line 38 and separating the sand from the sample, sand concentration being expressed as percent by bulk volume. A sand concentration of between 3 percent and 20 percent by volume of drilling fluid was found to give optimum penetration rate. Inasmuch as drilling fluid containing very high concentrations of sand is difficult to pump, it is preferred to employ a sand concentration in the range between about 5 percent and about 15 percent by volume.

Examples of two drill bits are illustrated in FIGURES 10 to 21. These bits have embodied therein the above-disclosed optimum value of standoff. There results a jet bit that is substantially free of mechanical breakage and wear, and which when supplied with fluid under sufficient pressure to develop jet stream velocities exceeding the critical minimum cutting velocity, will drill rock faster than a conventional mechanical bit especially in hard rock. In order to develop a jet velocity of, for example 770 f.p.s. with 9.3 pounds/gal. fluid requires a pressure of about 5000 p.s.i., and it is advantageous to employ pressure of this order inasmuch as it is known that the cutting rate increases with the velocity of the jet stream. In operating the jet bits of FIGURES 10 to 21 in accordance with this invention the pressure of drilling fluid supplied to the bit exceeds the critical minimum cutting pressure required for the jet to cut the rock, since at lower pressure substantially no cutting action is produced.

Figure 11:
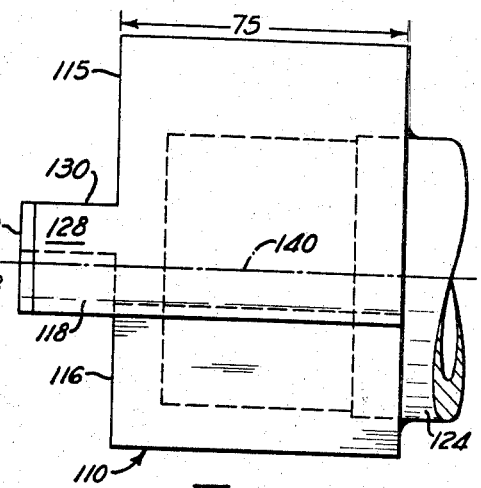
FIGURE 11 is a side elevation of the drill bit of FIGURE 10 as viewed from the right side of FIGURE 10.
Figure 12:
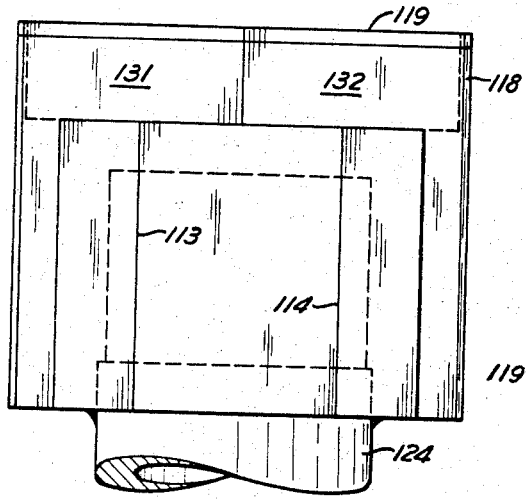
FIGURE 12 is a front elevation of the drill bit of FIGURE 10 as viewed from the lower side of FIGURE 10.

The bit of FIGURES 10 to 14 inclusive comprises a body portion 110 having an outline substantially as indicated in FIGURE 10. The body comprises a substantially cylindrical sector 111 and an adjoining prismatic portion 112 having the shape of a prism whose outer corners 113 and 114 lie on a circle having a radius smaller than the radius defining the cylindrical surface of portion 111. The flat surfaces of the prismatic portion 112 are for the purpose of forming fluid return channels, and instead of being plane surfaces as illustrated may be concave flutes on a continuation of the cylindrical portion 111. The prismatic portion 112 is shown as having three plane surfaces but if desired, two, four, or more plane surfaces may form the prism comprising the portion 112. The bottom surface 115 of the cylindrical sector 111 and the bottom surface 116 of the prismatic portion 112 are substantially coplanar to form a flat-ended bit body.

A tongue 118 extends from the bottom surface 115 and has a shape substantially as shown in the figures. The tongue 118 forms an important element of the drill bit of this invention. The tongue 118 extends completely transversely across the end of the body portion 110 and its side faces 126 and 128 are curved to form extensions of the cylindrical outer surface of the body portion 111 of the bit. The outline of the tongue 118 as seen end-on in FIGURE 10 is such as to allow room for jet nozzles to be described. The length of the tongue 118 in the axial direction determines the standoff of the jet nozzles from the bottom of the hole being drilled. Inasmuch as a standoff of 1 inch is preferred as previously explained, the axial length of tongue 118 is made 1 inch. The substantially flat bottom surface of the tongue 118 is provided with hard facing 119 which serves to resist wear.

The inner portion of the body 110 is bored to a diameter 120 which is provided with a substantially flat inner bottom surface 121. The upper end of the inner bore may be enlarged in diameter slightly as shown at 122 and after fabrication the bit is fastened to a conventional drill pipe or drill collar 124 as by shrinking and welding as indicated.

Figure 13:
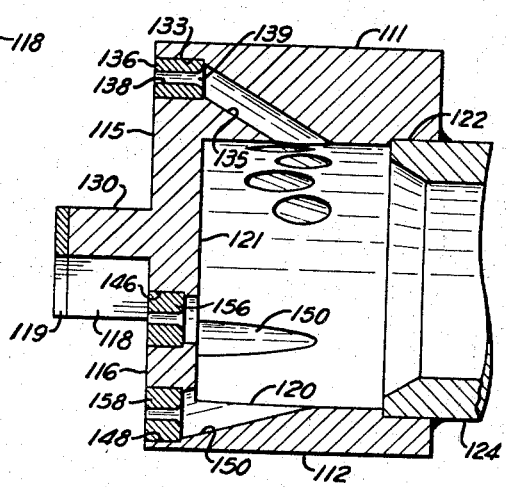
FIGURE 13 is a section taken at the plane XIII—XIII of FIGURE 10.

The bottom 115 of the cylindrical body portion 111 is drilled to form a number of holes 133 and 134 best seen in FIGURES 10 and 13. The holes 133 are drilled perpendicularly to the surface 115, i.e. parallel to the longitudinal axis of the bit stem and bit. Alternate holes 134 are drilled at an angle, as for example 25° with the longitudinal axis of the bit stem. All of the holes 133 and 134 intersect the end surface 115 on substantially the same radius as best seen in FIGURE 10. While FIGURE 10 shows five perpendicular holes 133 and four angled holes 134, this is by way of illustration only and the number of these holes may vary depending on considerations to be explained. Furthermore, the holes 133 and 134 may be located on the same or different radii. The inner end of each hole 133 and 134 meets with one of a number of holes 135 best seen in FIGURES 13 and 14. The holes 135 are drilled from the inside of the body of the bit at an appropriate angle to meet the respective holes 133 and 134. Drilling fluid pumped down the inside of the drill stem into the central cavity 120 of the bit thus flows through the holes 135 and out the holes 133 and 134 as well as other holes to be described.

In each of the holes 133 and 134 there is inserted and fastened a nozzle 136 and 137 whose cross section is best seen in FIGURE 13, and previously explained in more detail in connection with FIGURES 3 and 4. The nozzles 136 and 137 are held in place by brazing. Each of the nozzles 136 is made of a hard material, for example wear-resistant cemented carbide material available under the trademark Kennametal. Each of the nozzles 136 and 137 has an axial opening 138 that is provided at its inner end with an elliptical approach section 139 in order to provide streamline entrance flow into the nozzle as previously explained in connection with FIGURES 3 and 4.

The bottom 116 of the prismatic portion 112 of the bit is drilled with a number of holes, as for example holes 146, 147, 148, and 149 that communicate with the inside of the bit via milled recesses 150 best seen in FIGURE 13. The holes 146, 147, 148, and 149 are drilled substantially parallel to the axis of the bit stem and each hole is provided with a nozzle 156, 157, 158, and 159 made of hard wear-resistant material fastened in place by brazing. Each nozzle has a central opening with an elliptical entrance opening similar to those of nozzles 136. Drilling fluid pumped down the inside of the drill stem thus flows through the nozzles 156, 157, 158, and 159, as well as through nozzles 136 and 137.

Each of the nozzles 136, 137, 156, 157, 158, and 159 has a central bore that is substantially parallel sided over the greater part of its axial length and has an inside diameter of ⅛ inch. The axial length of the respective nozzles may vary somewhat but is preferably in excess of ⅜ inch.

The arrangement, number, and angular orientation of nozzles 136, 137, 156, 157, 158, and 159 is such as to effect a uniform penetration over the entire target surface on which the jets impinge. The drill bit is rotated during drilling so that each jet or series of jets having the same impact radius on the bottom of the hole scans an annular region whose area is directly proportional to its radius. Accordingly for a single jet the penetration rate is proportional to $R^{-n}$, where $R$ is the radius and the exponent $n$ is in the neighborhood of unity. We have found however that the exponent $n$ varies slightly from unity, usually being somewhat larger. We prefer to employ bits whose nozzles are of about the same size so as to develop substantially equal efficiencies, and arranged so that the jets strike the target at a radius whose exponent $n$ in the above relationship is in the range 0.8 to 1.2, with a value of $n$ equal to unity preferred. It is preferred to avoid overlap of the annular grooves cut by jets of adjacent radii because the jets will cut a deeper groove in the overlap region than in the grooves where there is no overlap, and this lack of uniformity in the resulting penetration rate will impair the drilling efficiency of the bit as a whole. Maximum penetration rate of the bit as a whole is obtained with nozzles arranged to cut with a substantially uniform downward penetration into the formation drilled over the area on which the jet streams impinge.

In the example illustrated in FIGURES 10 to 14 the nozzle 156 is located at the smallest radius from the rotation axis 140, and being directed parallel to the axis 140 will cut the bottom of the hole at the smallest radius. The penetration of this jet at this diameter under operating conditions will be known as well as the approximate width of the groove cut thereby. Nozzle 156 is substantially one groove width from the center of rotation of the bit. At substantially one groove width further out from the axis a second radius is provided with nozzles 157, 158, and 159. Inasmuch as this radius is substantially three times as large as the operating radius of nozzle 156, it is necessary to employ three nozzles (i.e. 157, 158, and 159) at the larger radius in order to attain the same penetration as nozzle 156. A further groove-width step outward from the axis of rotation is the radius 142 on which nozzles 136 are located. This radius is substantially five times the radius of nozzle 156, and therefore five nozzles 136 are employed at this radius. Note that the radii are those on which the respective jets strike the bottom of the hole being drilled, hence nozzles 157 and 136 being parallel to the axis 40 are located on these respective radii.

Figure 14:
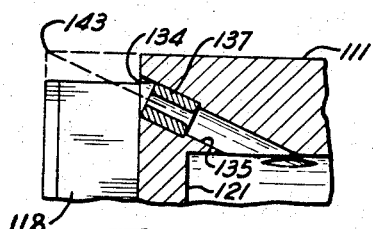
FIGURE 14 is a section through one of the jet nozzles as indicated by XIV—XIV of FIGURE 10.

It is apparent that structural considerations limit the maximum radius at which a nozzzle can be mounted in the body of the bit 10. Hence, in order to cut the outer circumference of the hole the nozzles are mounted at an outwardly directed angle as are nozzles 137. As indicated in FIGURE 14, the nozzles 137 are directed to the outer periphery of the hole as determined by the intersection 143 of the cylindrical surface of the cylindrical portion of the body of the drill and the lower end of the tongue 118. While the radius of the intersection 143 from the axis 140 is found in the example here described to be 20 percent larger than the radius at which the jets from nozzles 136 strike the bottom of the hole, there is an overlap between the groove cut by the jets from nozzles 136 and that cut by jets from nozzles 137. Accordingly, the number of nozzles 137 employed at any specific radius is somewhat reduced by the overlap, and in this example it is found that four jets from nozzles 137 are required. These principles may be applied to the design of any size jet bit similar to those herein described in which jets are substantially perpendicular to the target surface. When the nozzzles of substantially equal efficiency produce jets that impact the hole bottom nearly perpendicularly, the number of jets employed to strike a groove of any given radius of hole bottom is proportional to the radius to the power $n$ of the previously mentioned relationship. The width of groove cut is a function of the diameter of the nozzle orifice and nature of the rock being cut and is easily determined by experiment. The hard facing on the bottom of the tongue 118 serves to break off ridges that may remain between grooves as well as to control standoff of the nozzles.

FIGURES 15 to 21 inclusive illustrate another embodiment of the herein disclosed optimum values of jet drill parameters. The bit of FIGURES 15 to 21 comprises a body portion that is substantially cylindrical with a cross section shown in FIGURE 18. There are two reentrant portions 205 and 206, which while shown slightly different in outline in FIGURE 18, may be of the same or similar shape. The upper end of the body portion (this being the lower end as seen in FIGURES 15 and 16) is fastened as by welding to an adapter 201 whose upper end is shrunk and welded at 202 to the stem 203. The adapter 201 has a generally oval central opening 204 whose outline is best seen in FIGURE 18. The opening 204 communicates with the axial opening 207 in the stem 203. Stem 203 is smaller in diameter than body 200 and is provided with conventional drill-type threads (not shown) so that the entire bit assembly may be removably connected to a conventional drill pipe, as for example 19 of FIGURE 1. The lower end of the body portion 200 is closed by an end plate 210 which may be made integral with the body portion 200 or otherwise fastened thereto. The end plate 210 is substantially flat as indicated.

The bottom of each reentrant portion 205 and 206 is covered by a block 211 whose outline is best seen in FIGURE 15. Each block 211 has a peripheral surface 212 that substantially conforms to the shape of the circular cylindrical surface forming the outer periphery of the body portion 200. The other two sides of the blocks 211 subtend an angle of sufficient span to cover the respective reentrant portions 205 and 206 of the body portion 200. The blocks 211 can be fastened to the body portion 200 as by welding. The bottom surface of each block 211 is provided with a hard facing 213 of wear-resistant material, as for example Kennametal.

The end plate 210 is drilled with a plurality of holes 221, 222, 223, 224, and 225 which communicate with the inner chamber of the body portion 200. The holes are drilled at various distances from the axis 227 of the bit and at various angles with respect to the bit axis to cut a plurality of concentric grooves. The axes of holes 221 and 222 intersect the bit axis. Holes having the same reference numeral make the same angle with, and are the same distance from the axis of the bit. The holes 223, 224, and 225 are drilled parallel to the axis of the bit. In each of the holes 221, 222, 223, 224, and 225 there is mounted a nozzle 231, 232, 233, 234, and 235, respectively of the type shown in FIGURES 3 and 4, the nozzle being made of wear-resistant material and held in place as by brazing.

The blocks 211 previously mentioned are for the purpose of maintaining the optimum standoff for the nozzles. The blocks 211 also break off the tops of ridges that remain on the bottom of the borehole. Inasmuch as the borehole below the bottom of the end plate 210 is substantially enclosed, the spent drilling fluid exits substantially entirely around the outside of the bit; hence, a hole slightly larger than the outer periphery 212 of the bit is required. In order to cut the bottom of the hole to this diameter, the nozzles 231 are angled outward as best seen in FIGURE 19, so that their jets intersect the outer periphery of the bottom of the hole substantially at the standoff distance determined by the blocks 211 and 212. Thus the nozzles 231 mounted in holes 221 are angled outward so that the axis of the nozzle 231 makes an angle of 27° with the axis of the bit as shown in FIGURE 19. Four nozzles 231 are employed to produce jets that cut the outer periphery of the hole. The nozzles 232 in the holes 222 are also angled outward slightly, these being at an angle of 7° with the axis of the bit as shown in FIGURE 20. The jets from the nozzles 232, four in number, strike the bottom of the hole at a radius just inside the groove cut by nozzles 231. Inasmuch as there is little difference between the radii of the locus of impact of the jets from nozzles 231 and 232, there are four nozzles 232 employed so as to provide at the radius of impact of their jets substantially the same penetration as the jets from nozzles 231. Jets from the vertical nozzles 233 strike at the next smaller radius and it is found that three nozzles 233 will meet the penetration requirement at this smaller radius. At the next smaller radius two nozzles 234 are employed, the radius of nozzles 234 being substantially two-thirds the radius of nozzles 233. At a still smaller radius a single nozzle 235 is sufficient to develop the necessary equal penetration rate, the radius of nozzle 235 being substantially one-half of the radius of nozzles 234. It is seen that the nozzles 231 to 235 are located so that their respective jets strike the formation drilled at intervals over the full diameter of the borehole in number and radius to provide substantially uniform downward penetration of the formation drilled over the area of impingement of the jets.

In the bit of FIGURES 15 to 21 the standoff is controlled by the axial height of the blocks 211 and 212. In accordance with the previously explained indications of FIGURE 7 the height (or axial length) of blocks 211 and 212 including the hard facing 213 is made to be in the range ½ inch to 1¼ inches and is preferably about 1 inch. The bit of FIGURES 15 to 21 is operated with drilling fluid containing sand of predominantly 20 to 40 mesh in concentration between 3 percent and 20 percent by volume, and it is preferred to use between .5 percent and 15 percent sand.

An important desideratum in the design of a jet bit is to avoid erosion of the bit itself both inside and outside. The effect of standoff on erosion of the outside of the bit has already been discussed in connection with FIGURE 7. It has also been found that excessive external erosion takes place when substantially vertical jets such as are employed in the jet bits of FIGURES 10 to 21 are placed closer together than about ⅜ inch between center lines. For example if a plurality of nozzles are bunched close together, there will be excessive erosion of the surrounding bit body. We prefer that the nozzles be spaced greater than about ⅜ inch between centers and that they be spaced greater than about ⅜ inch from the standoff bar. This substantially avoids external erosion of the nozzle, standoff bar, and bit body. In order to minimize internal erosion the interior fluid flow paths are designed to avoid abrupt changes in direction of the fluid adjacent the interior surfaces of the bit body. Thus for example, the nozzles 231 and 232 of the bit of FIGURES 15 to 21 are located to eliminate internal erosion by permitting the internal fluid direct access to the elliptical entrance to each nozzle without prior change of fluid direction. We prefer to place the nozzles so that they are spaced greater than ⅜ inch apart but less than such spacing as would introduce sharp changes in the direction of fluid flow in the interior of the bit body.

An important feature of this invention lies in the fact that very little weight is put on the jet bit of this invention during operation. We have found that the drilling rate for a bit of the type illustrated in FIGURES 10 to 21 is maintained at a high rate when the bit weight is less than 700 pounds per inch of bit diameter, whereas conventional mechanical bits require much higher bit weight in order to cut hard rock at reasonable rates. The absence of mechanical cutters together with low bit weight permits the use of correspondingly low torque when using the jet bits of this invention. By way of example, FIGURE 9 shows curves of drill penetration rates for various bit weights on conventional bits as compared with that of the bit of FIGURES 15 to 21. Curve 91 is taken from a publication by N. H. Van Lingen entitled "Bottom Scouring—A Major Factor Governing Penetration Rate at Depth" in Journal of Petroleum Technology, vol. 14, No. 2, pp. 187–196, February 1962. This curve is plotted with weight per inch of bit diameter as abscissae and is for an experimental 1¼ inch drag bit (so called microbit) drilling in medium dense limestone (curve $f$ FIGURE 4(a) of the Lingen publication). Curve 92 is taken from page 2622 of the Composite Catalogue, 1960–61 edition and pertains to an 8¾ inch conventional "Tri-Cone" bit drilling in gray granite, the abscissae of the curve being pounds weight per inch of bit diameter. Drag bits are usually used with less bit weight than cone bits because of greater tendency to catch in soft rock, but drag bits are substantially ineffective in hard rocks which require cone or roller bits. When the present invention is employed, the weight applied to the bit is very low, as for example 500 pounds per inch of bit diameter. By way of example when drilling with the jet bit of FIGURES 15 to 21 herein described operating at a pressure of 5000 p.s.i.g. with aqueous fluid containing 6% by volume of sand of predominantly 20 to 40 mesh and 6% by weight of bentonite, the penetration rate observed on gray graphite was 63 feet per hour when the bit weight was 2200 pounds and the bit diameter was 4⅝ inches. It is seen that the bit weight applied to the jet bit of this invention is very substantially less than is conventionally applied to mechanical bits. Inasmuch as the jet bits illustrated in FIGURES 10 to 21 do substantially no mechanical cutting into the formation drilled, it is necessary to apply only enough bit weight to hold the bottom standoff bar against the bottom of the hole and break off the thin ridges between the grooves cut by the jets. The penetration rate is substantially independent of any greater bit weight. Accordingly, the curve 93 for a jet bit of this invention is substantially horizontal and it is seen that for the jet bits of this invention substantially higher penetration rates are achieved under conditions of very low bit weight. We have found that by employing this invention the bit weight may be held to less than 700 pounds per inch of bit diameter without appreciably impairing the drilling rate.

We have further found that for a jet bit similar to those herein disclosed there is an optimum rate of rotation which results in maximum rate of penetration of the drill. FIGURE 6 shows the results of tests with a 4⅝ inch diameter but similar in structure to that shown in FIGURES 11 to 14 and having eleven nozzles ⅛ inch in diameter when drilling in gray granite at various rotational speeds and using aqueous drilling mud of density 10.5 pounds per gallon including 6 percent by volume of sand predominantly 20 to 40 mesh. The exit velocity of the fluid from the nozzle was 770 feet/second which is well above the critical minimum cutting velocity. It is seen from curve 68 of FIGURE 6 that rotational speeds between about 20 r.p.m. and 60 r.p.m. result in high penetration rates. Accordingly, the jet bits of this invention employ a rotational speed in the range between about 20 r.p.m. and about 60 r.p.m., and we prefer to use about 40 r.p.m. for best results. This is in contrast to conventional mechanical bits for which the penetration rate continues to increase with increase in rotational speed.

As herein explained, this invention provides a method and apparatus for borehole drilling of hard formations by means of high-velocity hydraulic jets having a velocity that exceeds the critical minimum cutting velocity.

The drill bit disclosed in this application is claimed in our application Ser. No. 632,113, filed Apr. 19, 1967, entitled Hydraulic Jet Drill Bit. Ser. No. 632,113 is a division of Ser. No. 311,088.

We claim:

1. A hydraulic method of drilling the borehole of a well through hard subsurface formations comprising rotating a drill bit at the bottom of the borehole about a vertical axis, pumping an abrasive-laden drilling liquid down drill pipe in the well to the rotating drill bit, discharging a plurality of hydraulic jet streams of the drilling liquid at velocities exceeding 650 feet per second downwardly from the rotating drill bit against the formation being drilled to cut a borehole of the desired diameter, said jet streams being discharged from the drill bit at a distance of ½ inch to 1¼ inches above the lower end of the drill bit, maintaining the lower end of the drill bit in contact with the bottom of the borehole, said jet streams being positioned to impinge against the formation being drilled at intervals over the full diameter of the borehole and penetrate the formation substantially uniformly over substantially the entire area of impingement of the hydraulic jets, and circulating the drilling liquid and entrained cuttings upwardly around the drill pipe to the top of the borehole.

2. A hydraulic jet method of drilling the borehole of a well through hard subsurface formations comprising rotating a drill bit at the bottom of the borehole about a vertical axis, delivering an abrasive-laden drilling liquid into drill pipe under a pressure of at least 5000 pounds per square inch and downwardly through the drill pipe into the drill bit, discharging downwardly from the drill bit at a level ½ inch to 1¼ inches above the lower end of the drill bit and at velocities of at least 650 feet per second a plurality of hydraulic jet streams of the drilling liquid, said hydraulic jet streams being located to impinge against the formation being drilled at intervals over the full diameter of the borehole and penetrate the formation substantially uniformly over substantially the entire area of impingement of the hydraulic jets, supporting the drill bit on the bottom of the borehole with the jet streams leaving the drill bit ½ inch to 1¼ inches above the bottom of the borehole, and circulating the drilling liquid upwardly around the drill pipe to the top of the borehole.

3. A hydraulic jet method of drilling the borehole of a well through hard subsurface formations comprising rotating a drill bit at the bottom of the borehole around a vertical axis, delivering an abrasive-laden drilling liquid into drill pipe under a pressure of at least 5000 pounds per square inch and downwardly through the drill pipe into the drill bit, discharging at a level ½ inch to 1¼ inches above the lower end of the drill bit and at velocities of at least 650 feet per second a plurality of hydraulic jet streams of drilling liquid downwardly to impinge on the formation being drilled, said hydraulic jet streams being located to impinge against the formation being drilled at intervals over the full diameter of the borehole and penetrate the formation substantially uniformly over substantially the entire area of impingement of the hydraulic jets, supporting the drill bit on the bottom of the borehole with the jet streams leaving the drill bit ½ inch to 1¼ inches above the bottom of the borehole, urging the drill bit against the bottom of the borehole with a force less than 700 pounds per inch of diameter of the borehole to maintain the level of discharge of the hydraulic jet streams ½ inch to 1¼ inches above the bottom of the borehole, and circulating the drilling liquid upwardly around the drill pipe to the top of the borehole.

4. A method as set forth in claim 3 in which the drilling liquid is an aqueous suspension of bentonite and sand containing 2 to 10 percent bentonite and 5 to 15 percent sand.

5. A method as set forth in claim 3 in which the bit is rotated at a rate of about 20 to 60 revolutions per minute.

References Cited

UNITED STATES PATENTS

| | | | |
|---|---|---|---|
| 666,799 | 1/1901 | Buckwalter | 175—422 |
| 2,518,591 | 8/1950 | Aston et al. | 175—422 |
| 2,785,875 | 3/1957 | Hayes | 175—422 |
| 3,112,800 | 12/1963 | Bobo | 175—67 |

JAMES A. LEPPINK, *Primary Examiner.*